No. 816,943. PATENTED APR. 3, 1906.
F. W. SCHULTZ.
MACHINE FOR FORMING AND SECURING SOLDER TO METAL CAPS.
APPLICATION FILED SEPT. 7, 1905.
3 SHEETS—SHEET 3.
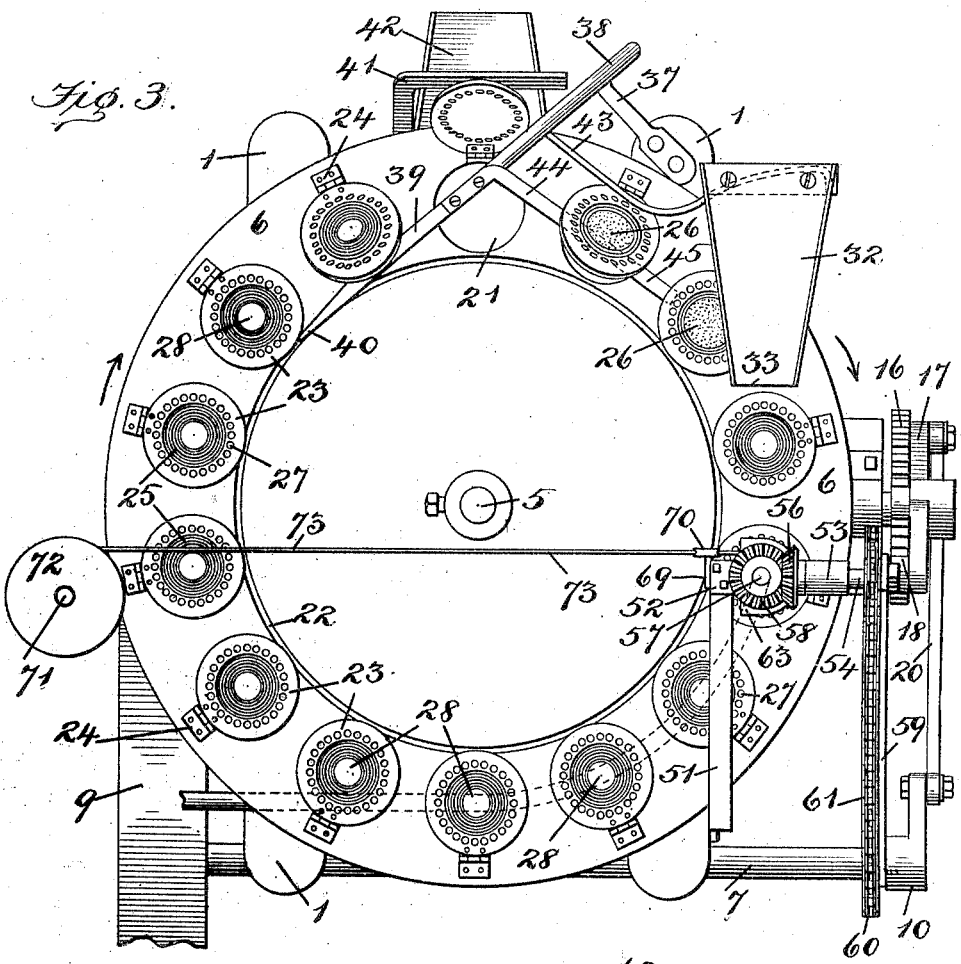
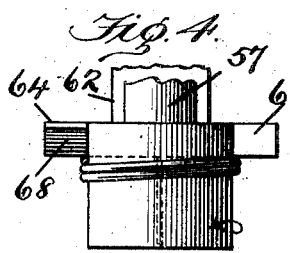
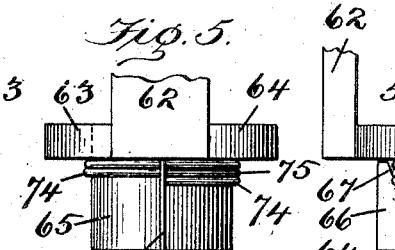
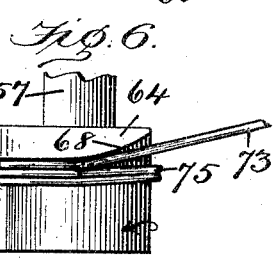
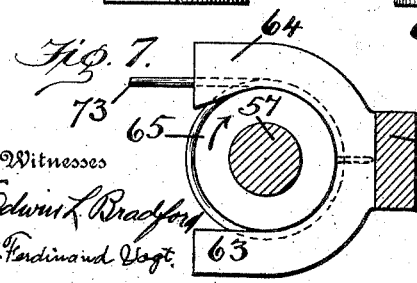
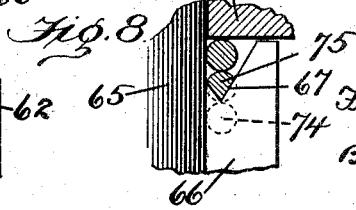
Witnesses
Edwin L. Bradford
G. Ferdinand Vogt
Inventor
Frederick W. Schultz
By Mann & Co,
Attorneys

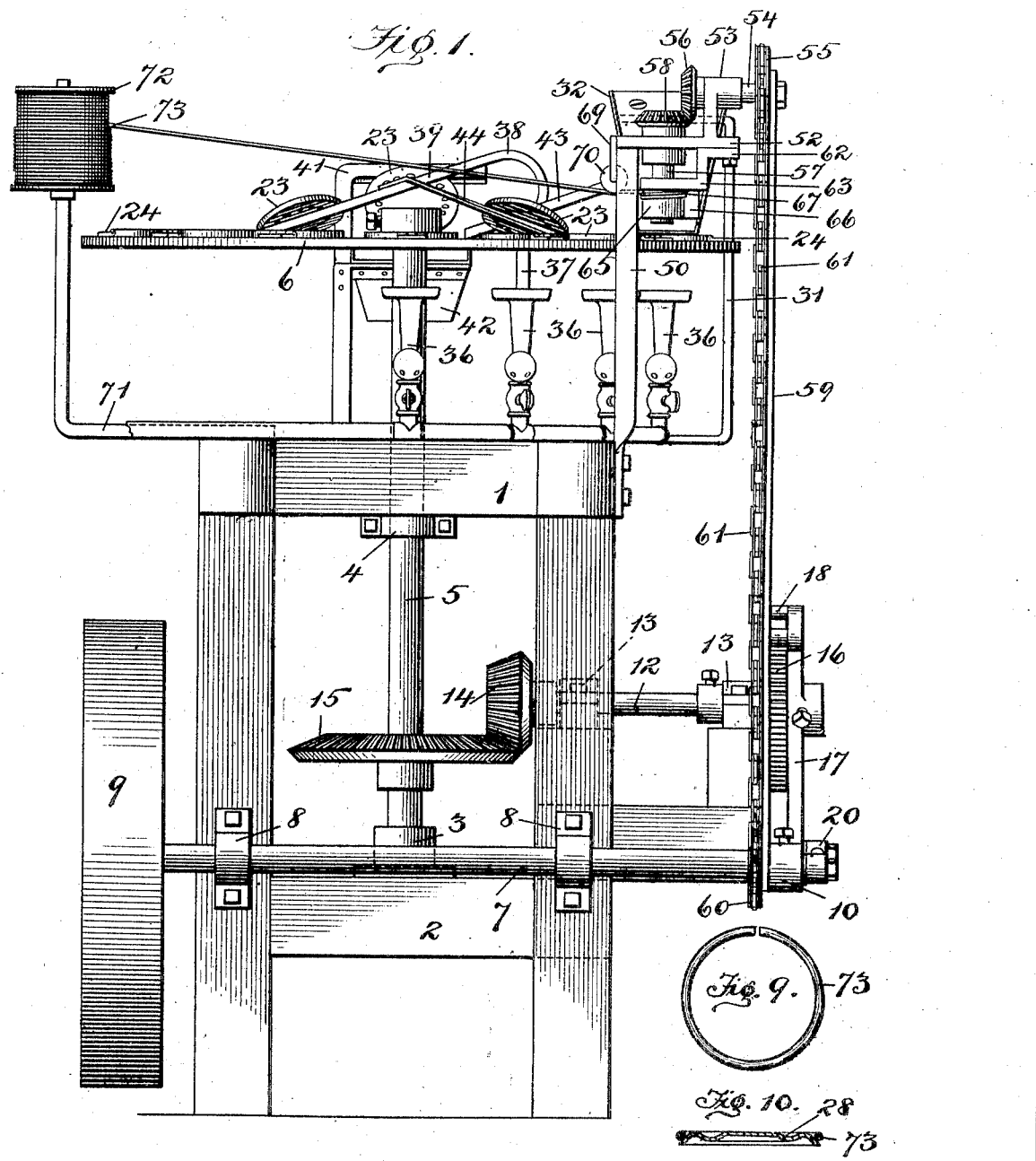

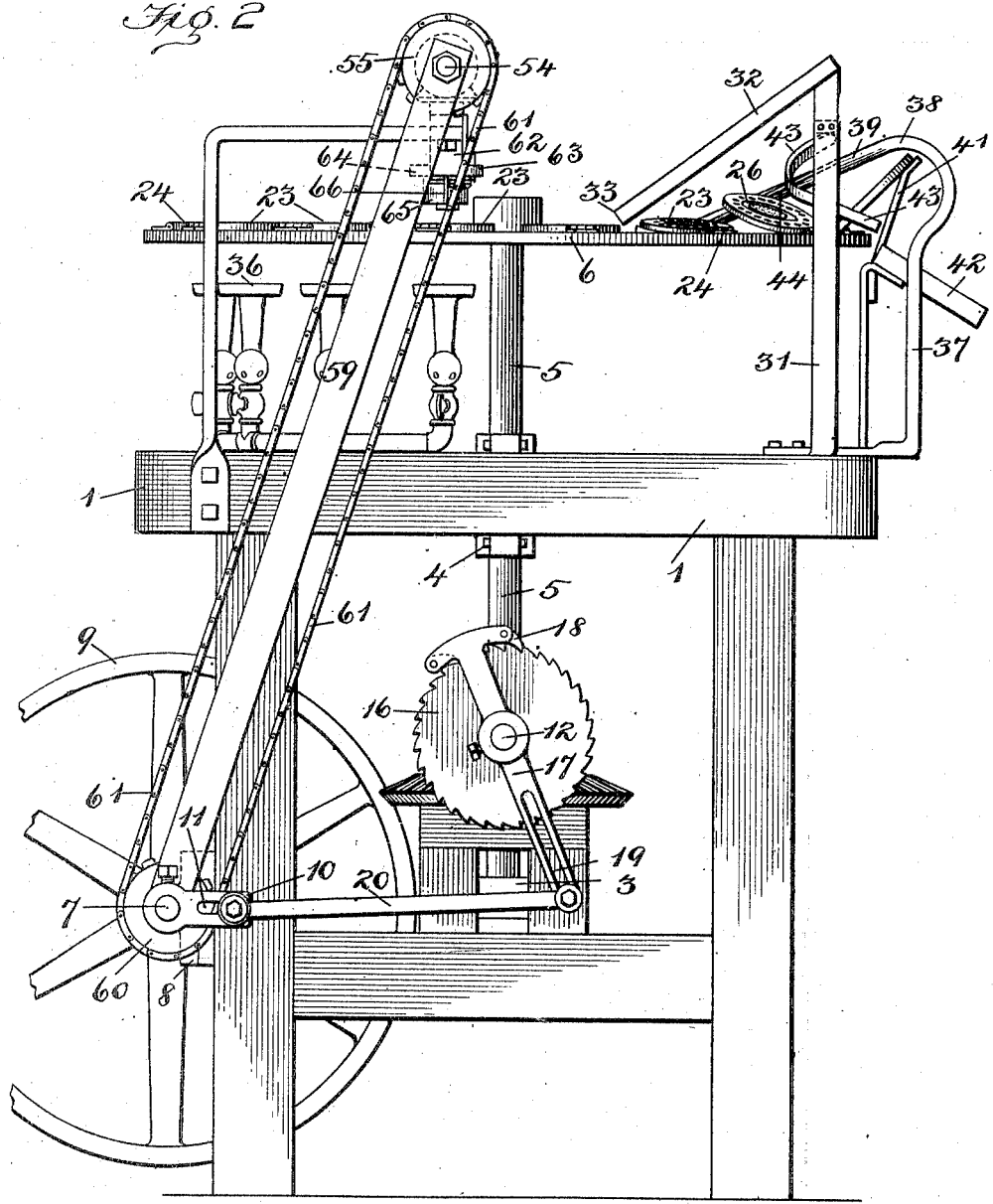

UNITED STATES PATENT OFFICE.

FREDERICK W. SCHULTZ, OF BALTIMORE, MARYLAND.

MACHINE FOR FORMING AND SECURING SOLDER TO METAL CAPS.

No. 816,943.      Specification of Letters Patent.      Patented April 3, 1906.

Application filed September 7, 1905. Serial No. 277,284.

*To all whom it may concern:*

Be it known that I, FREDERICK W. SCHULTZ, a citizen of the United States, residing at Baltimore, in the State of Maryland, have invented certain new and useful Improvements in Machines for Forming and Securing Solder to Metal Caps, of which the following is a specification.

This invention relates to a machine for forming a ring of solder and fusing the same upon the top surface and adjacent the rim edge of sheet-metal can-caps for the purpose of facilitating the soldering of such caps upon cans.

The present invention relates more particularly to devices for forming wire-solder into the shape of a ring and placing the solder ring on the top surface of the can-cap. The mechanism employed in fusing the solder rings to the caps is shown and described in my pending application for another patent, Serial No. 259,551, which was filed May 9, 1905.

One object of the invention is to provide means by use of which wire-solder may be produced in a ring form and of a size to suit the particular cap to which it is to be applied.

Another object of the invention is to provide mechanism by which the wire-solder rings may be automatically fed to and placed upon the top surface of the caps for attachment thereto.

Another object of the invention is to provide a combination of mechanism whereby any number of can-caps may be successively supplied on their top surfaces with solder rings, which become attached to the cap by fusion.

With these and other objects in view the invention is illustrated in the accompanying drawings, in which—

Figure 1 illustrates a front elevation of the machine embodying my invention. Fig. 2 illustrates a side elevation of the same. Fig. 3 illustrates a plan view of the same. Figs. 4, 5, 6, 7, and 8 illustrate enlarged details of the pendent mandrel on which the solder rings are formed. Fig. 9 is a view of a wire-solder ring; Fig. 10, a section of a can-cap and solder ring attached.

As the greater part of the mechanism here shown is a duplication of the devices illustrated and claimed in my said pending application, so much of the descriptive matter employed in said application as is deemed necessary will be incorporated bodily into the present specification.

Referring to the drawings by numerals, 1 designates a frame or table of any suitable constructions and having a lower center cross-beam 2, on which a step-bearing 3 is secured. A vertical bearing 4 is also provided above the step-bearing, and a center vertical shaft 5 has its lower end sustained in said step-bearing, while its upper end passes through the vertical bearing 4 to a point above the frame or table. At the upper end the vertical shaft carries a circular plate 6, which is to have a step-by-step revolution in a horizontal plane.

A horizontal driving-shaft 7 is mounted in bearings 8 at the front of the frame, and one end of this shaft carries a driving-pulley 9, while the other end of said shaft carries a crank-arm 10, which latter is provided with a slot 11.

A horizontal shaft 12 is sustained in suitable brackets 13, and the inner end of this shaft carries a pinion 14, which meshes with a gear 15, mounted on the lower end of the vertical shaft 5. At the outer end the horizontal shaft 12 carries a ratchet-wheel 16, and the extreme outer end of said shaft, at the side of said ratchet-wheel, is provided with an oscillating lever 17, the upper end of which carries a pawl 18, which engages the ratchet-wheel 16, while the lower end of said lever is provided with a slot 19. A rod 20 has one end pivotally connected to the lower slotted end of the oscillating lever, while the other end of said rod is pivotally connected to the crank-arm 10. It will thus be seen that as the pulley 9 is revolved the shaft 7 and crank-arm 10 will also revolve, while the rod 20 will impart an oscillating movement to the lever 17 and cause the ratchet-wheel 16 to revolve the shaft 12 and pinion 14 intermittently. Thus the gear 15, vertical shaft 5, and circular plate 6 will be revolved intermittently in a horizontal plane.

The circular plate 6 is provided with a plurality of holes or perforations 21, which have position in a circular path and adjacent the outer or rim edge of the circular plate. These holes are arranged at regular intervals apart, and in the present instance there are fourteen of them shown, although the number is immaterial and may be more or less than that shown.

Adjacent the holes or perforations the plate 6 is provided with a circular groove or channel 22 for a purpose presently to be described. Each of the holes or perforations in the plate is provided with a disk 23, which latter are secured by hinges 24, so that the disks may be raised or lowered over the holes in the plates. Each of these disks is provided with a central depression with a circular channel-groove 25 adjacent the edge, and the central portion of said depression is provided with a circular sheet of some suitable material 26, which is a poor conductor of heat—such, for example, as asbestos. Between the depressions and the outer rim edge each disk is provided with a plurality of perforations 27, so that the disks may be heated and cooled quickly. The depressions in the disks are of a size to receive a cap 28 of a sheet-metal can, the downturned rim edge of which will fit snugly in the channel-groove 25, while the central arched portion will bridge over the asbestos packing, which will protect it from the heat and prevent scorching or discoloring the metal.

A bracket 31 is bolted to the top portion of the frame and extends vertically at the side and slightly toward the rear of the circular plate 6, and the upper end of said bracket extends inwardly over the said plate and sustains a chute 32, the lower end 33 of which terminates at a point adjacent the top surface of the circular plate. The intermittent movements of the plate 6 are regulated so that at each pause one of the perforations or holes 21 will have position directly beneath the lower end 33 of the inclined chute, and during the pause of the plate the operator will place a cap 28 in the chute, and said cap will slide down and be discharged into the depression in the disk 23, and the rim edge of the cap will seat snugly in the channel-groove 25, which forms a mold for the solder. After the cap has been deposited in the depression of the disk 23, at the lower end of the chute, the table is given a partial rotation, so as to present another disk beneath the chute, and the disk which has just received a cap will have position beneath the mechanism which forms and delivers the solder ring or washer. The solder mechanism will now be described.

A bracket 50 is rigidly secured to the frame 1 of the machine, and said bracket extends vertically and projects above the table 6, and at the upper end the bracket has an arm 51, which extends horizontally over the table. The inner end of this arm supports a rigid bracket 52, which latter carries a bearing 53, through which a short horizontal shaft 54 extends. The outer end of this short shaft carries a sprocket-wheel 55, while the inner end of said shaft carries a bevel-gear 56, as will clearly be seen in Figs. 1 and 3. A vertical shaft 57 is also sustained by the bracket 52, and the upper end of this vertical shaft carries a bevel-gear 58, which meshes with and is driven by the gear 56 on the shaft 54. This vertical shaft 57 is sustained so as to have position directly over the center of the disk beneath it on which a cap is seated ready to receive the solder. A bar 59 extends in an inclined direction from the short horizontal shaft 54, which latter passes through it down to the main driving-shaft 7, and the purpose of this bar is to steady the short shaft 54 and maintain it in a rigid position and parallel with the driving-shaft. A sprocket-wheel 60 is carried on the driving-shaft at the side of the bar 59, and a sprocket-chain 61 passes around the said sprocket 60 and also around the sprocket-wheel 55 on the short shaft 54, and this latter shaft is driven by the main shaft through this chain. The size of the sprocket-wheels is such as to give the vertical shaft 57 one revolution between the intermittent movements of the table for a purpose presently to be described.

Depending beneath the rigid bracket 52 is a stationary bracket 62, the lower end of which is provided with two arms 63 and 64, which together form a U shape and curve concentrically about a pendent mandrel 65 at the lower end of the vertical shaft 57. The diameter of the mandrel is equal to or slightly smaller than the cap that is to receive the solder ring, and this pendent mandrel turns between the said two arms 63 and 64 and is thereby prevented from vibrating while revolving.

A blade 66 is secured in any desired manner to the vertical side of the mandrel 65, and this blade is rigid with respect thereto. The upper end of the blade is provided with a V-shaped cutting-notch 67, which notch is formed at the inner side of the blade and adjacent the vertical wall of the mandrel 65. The upper end of the blade while making a revolution with the mandrel passes beneath the two arms 63 64. One arm 64 has at its end a beveled bottom surface 68, which comes at the side of the mandrel 65 for a purpose presently to be set forth. At one side the bracket 52 carries a plate 69, and a grooved roller 70 is mounted so as to revolve freely at the side of said plate. This grooved roller has position directly in front of the beveled arm 64 and is utilized to guide the wire-solder, as will presently appear. A bracket 71 is secured on top of the frame 1 and projects vertically above the table, and the upper end of the bracket carries a spool 72, on which the supply of wire-solder 73 is wound and from which it is to be drawn and wound around the pendent mandrel 65. The strand of wire solder is passed from the spool beneath the grooved roller 70, then underneath the arm 64, and around the mandrel 65 of the vertical shaft.

As the pendent mandrel revolves the wire-solder makes the first coil 74 beneath the two arms 63 64. Each succeeding coil winds above the last one on the mandrel and operates to crowd or push down the coil wound next before it. The second coil 75 is wound above the first coil 74, and as the third coil is being wound the first or lowermost coil 74 will be forced downward on the mandrel and on the V-notch 67 of the cutter-blade and cut, and thereupon said lowest coil just cut will immediately drop from the pendent mandrel and be deposited on the cap that is seated on the disk 23 beneath the mandrel. As soon as this ring of wire-solder has been thus deposited the table or plate 6 makes another partial turn and stops, so that another cap and disk will take position beneath the mandrel to receive a wire-solder ring.

When one ring of wire has been cut and discharged from the mandrel, it is necessary to provide some device to hold the remaining strand or coil to prevent it from unwinding or slipping as the mandrel continues its revolution, as the wire-solder is drawn from the spool 72 by means of the revolution of the mandrel 65. This holding of the coil on the mandrel is accomplished, as will be seen by reference to Fig. 8, by providing a space between the V-notch and the bottom surface of the arm 64 equal to the thickness of one and one-half coils of wire-solder, so that before a complete cut can be made through the first coil 74 the cutting of the second coil 75 will be begun, and when the first coil is completely cut the second will be only half cut, and as the edge of the V-cutter is embedded half-way through the second coil the latter obviously cannot slip or unwind and will be held sufficiently to draw the wire-solder from the spool. After the ring of wire-solder has dropped from the pendent mandrel to the cap deposited on the hinged disk the next intermittent movement of the circular plate 6 will cause the disk on which the tin cap and solder ring are resting loosely to move over the first of a series of burners 36, where the flame from the first burner will be projected against the bottom surface of the disk, so as to begin heating the latter. As there are a series of these burners 36, arranged at regular intervals apart, the disks will be heated during several intermittent movements of the circular plate, and each burner will play a part in heating the disk and solder, so that the latter will be heated sufficiently to fuse it and cause it to stick to the top surface of the cap adjacent the rim edge thereof, but leave the said rim edge of the cap exposed and without solder. After the disks have been passed beyond the burners the solder on the cap will set and get hard, and it is at this point in the operation that the series of perforations 27 in the disk are useful in allowing the air to circulate and by contact with the increased area of metal cause the disks to rapidly cool sufficiently to permit the caps, with the solder adhering to the edge, to be discharged from the disks.

The operation of discharging the soldered disks will now be described. As has heretofore been explained, the disks are each hinged to the circular plate, and the object of thus hinging them is in order that they may be raised and turned backward to dump or discharge the caps. At the rear of the machine I provide an arm or rod 37, the lower end of which is bolted to the frame and the upper end 38 of which curves forwardly and then extends downwardly in an inclined direction, as at 39, toward the circular plate 6. The lower end of this inclined rod has a point 40, which projects close to the circular groove or channel 22 at the inner rim and in the top surface of the revoluble plate 6. It will be understood that when the hinged disks 23 are lying flat on the revoluble plate 6 their edges will project over the said circular groove or channel 22, and by this means as each disk arrives at the point 40 of the inclined rod the said point will take beneath the said overprojecting edge of the disk, and when the plate 6 makes its next intermittent movement the said overprojecting edge of the disk will ride up on the stationary pointed end of the rod and thereby begin to elevate and assume an inclined position above the holes in said plate. The next intermittent movement of the plate will cause the disks to be elevated to slightly more than a perpendicular position, with the result that the disk will then fall back against a stop-arm 41, which is also bolted to the frame and which projects above the plate, as clearly seen in Figs. 1 and 3. In falling backward against the stop-arm the disks are jarred and the caps with the solder applied will fall out into a discharge-chute 42 immediately beneath the stop-arm. Upon the discharge of the caps the disks are momentarily left standing in the rearwardly-inclined position, and it then becomes necessary to return them to the flat horizontal position over the holes in readiness to receive another cap upon its arrival at the feed-chute.

An inclined arm or bar 43 is attached at its upper end to the bracket 31, and from said bracket the bar 43 inclines downwardly toward the discharge-chute 42, and the lower end of said bar terminates beneath the stop-arm 41. As the plate 6 makes another partial or intermittent turn the rearwardly-inclined disk drops from the stop-arm (almost to a rearwardly-horizontal position) and falls on the lower end of said inclined bar 43, and the next partial movement will again elevate the disk by dragging it up the inclined bar 43 until it again falls forward and is caught by a reversely-inclined bar 44. This reversely-inclined bar 44 has its higher end attached to the inclined end 39 of the rod 37, and the lower end 45 of said rod projects forwardly toward the lower end of the feed-chute. After the disk has been thrown forward onto the bar 44 it will be gradually lowered as the plate 6 revolves until it reaches the lower end of the bar, where it will again fall over the hole in the plate in time to receive another cap from the feed-chute. This operation takes place with each of the disks, and the repeated operations of elevating, discharging, and returning the disks to normal horizontal position is carried on speedily and positively.

The finished product of this machine is a circular can-cap having a ring of solder secured only on its top surface adjacent the rim edge of the said cap and the said rim edge exposed and free of solder.

Having thus described my invention, what I claim as new, and desire to secure by Letters Patent, is—

1. A machine for forming wire-solder rings and applying them to metal caps, comprising a wire-solder supply; means for shaping the wire-solder to the form of a ring; means for cutting the ring of solder from the supply, and means for placing the wire-solder ring upon the top surface of the cap.

2. A machine for forming wire-solder rings and applying them to can-caps, comprising a cap-holder; means for imparting to a strand of wire-solder the shape of a ring; means for placing the wire-solder ring on the top surface of the cap; and means for applying heat to cause the solder ring to fuse sufficiently to become attached to said top surface of the cap.

3. A machine for supplying wire-solder for attachment to metal caps comprising a wire-solder supply, a mandrel around which the solder is wrapped to shape it and means whereby one wrap of solder on the mandrel is cut while another is being wound.

4. A machine for forming and applying solder to metal caps comprising a cap-holder, a wire-solder supply; a mandrel around which the solder is wrapped to shape it; means for cutting the shaped solder in a predetermined length and depositing it on the cap in the holder, and means for heating the shaped solder after it is in position on the cap.

5. A machine for forming wire-solder rings and applying them to can-caps, comprising a plurality of cap-holders; means for imparting to a strand of wire-solder the shape of a ring; means for successively presenting the said cap-holders to the position where each cap will receive on its upper surface a ring of solder, and means for fusing the solder rings sufficiently to attach them to said caps.

6. A machine for applying solder to metal caps comprising a plurality of cap-holders, a wire-solder supply; means for cutting the wire-solder in predetermined lengths, and means for presenting the cap-holders and caps successively to receive the holder as it is cut.

7. A machine for applying solder to metal caps comprising a plurality of cap-holders; a wire-solder supply; means for depositing the wire-solder on the caps in the holders in predetermined lengths; means for presenting the holders successively to receive the solder, and means for heating the lengths of solder after they have been deposited on the caps.

8. A machine for applying solder to metal caps comprising a wire-solder supply, a mandrel around which the solder is wrapped to shape it; a plurality of cap-holders; means for presenting the cap-holders to the mandrel successively; means for cutting the shaped solder and depositing it on the caps in the holders, and means for heating the solder after it has been deposited on the caps.

9. A machine for applying solder to metal caps comprising a wire-solder supply, a mandrel around which the solder is wrapped to shape it; a plurality of movable cap-holders; means for successively presenting the holders to the mandrel; means whereby as each holder is presented to the mandrel the wire-solder will be cut and deposited on the cap therein, and means for heating the cut solder after it has been deposited on the cap.

10. A machine for supplying wire-solder rings for attachment to metal caps comprising a wire-solder supply; a pendent mandrel around which the solder is wrapped in a plurality of coils; a cutter-blade attached to the mandrel; and means for forcing one coil of wire against the cutter-blade while another coil is being wound on the mandrel, whereby each coil as soon as cut will drop from said mandrel.

11. A machine for supplying wire-solder rings for attachment to metal caps comprising a wire-solder supply; a pendent mandrel around which the solder is wrapped in a plurality of coils; stationary arms about the upper part of the mandrel, and a cutter-blade attached to the mandrel below said arms, whereby the wire-solder winds on the mandrel beneath said arms and the coils of wire-solder will be pressed toward the cutter-blade.

12. A machine for supplying solder for attachment to metal caps comprising a wire-solder supply; a pendent mandrel around which the solder is wrapped in a plurality of coils; a cutter-blade at one side of the mandrel and revolving with the latter; and means for partly cutting one coil in order to hold it on the mandrel before the coil next below is completely severed.

13. A machine for supplying solder for attachment to metal caps comprising a wire-solder supply, a mandrel around which the solder is wrapped in a plurality of coils; a cutter-blade rigidly secured to and revolving with the mandrel; a stationary cam-surface at one side of the mandrel and adjacent which the cutting end of the cutter-blade passes whereby as the wire-solder is wound around the mandrel the several coils will be moved longitudinally along the mandrel to effect the cutting of one coil at a time.

14. A machine for supplying solder for attachment to metal caps comprising a wire-solder supply, a mandrel around which the solder is wound in a plurality of coils; a cutter-blade rigidly secured to and revolving with the mandrel and having a cutting-notch, and means for forcing the coils successively into the notch of the cutter as the mandrel revolves.

15. A machine for supplying solder for attachment to metal caps comprising a wire-solder supply, a revoluble mandrel around which the solder is coiled; a cutter-blade secured to the mandrel and extending in a crosswise direction with respect to the coils of solder; means whereby the solder coils may be moved along the mandrel as the latter revolves to effect the cutting of one coil and to secure the remaining coils to prevent their unwinding.

16. A machine for applying solder to metal caps comprising a carrier, a plurality of cap-holders on said carrier; means for supplying wire-solder; means adjacent the carrier for cutting the wire-solder in predetermined lengths to be delivered successively on the caps in the holders, and means for moving the carrier to present the holders and caps thereon in succession to receive the cut solder.

17. A machine for applying solder to metal caps comprising a carrier, a plurality of cap-holders sustained by said carrier; means for supplying wire-solder; means adjacent the carrier for cutting the wire-solder in predetermined lengths to be delivered successively on the caps in the holders; means for moving the carrier intermittently to present the holders and caps thereon successively to receive the cut solder, and means for heating the cut solder after it is in position on the cap.

In testimony whereof I affix my signature in presence of two witnesses.

FREDERICK W. SCHULTZ.

Witnesses:
JOHN W. HEWES,
G. FERDINAND VOGT.